United States Patent [19]

Carlsen

[11] Patent Number: 5,509,062
[45] Date of Patent: Apr. 16, 1996

[54] INTELLIGENT TERMINAL BASED SELECTIVE CALL FORWARDING

[75] Inventor: Ralph Carlsen, Port Monmouth, N.J.

[73] Assignee: AT&T Corp., Murray Hill, N.J.

[21] Appl. No.: 285,370

[22] Filed: Aug. 3, 1994

[51] Int. Cl.$^6$ .................................................. H04M 3/54
[52] U.S. Cl. ...................... 379/210; 379/211; 379/201; 379/142; 379/212; 379/58
[58] Field of Search .................................. 379/201, 202, 379/211, 216, 67, 200, 70, 91, 61, 210, 212, 142, 58

[56] References Cited

U.S. PATENT DOCUMENTS

| | | | |
|---|---|---|---|
| 4,313,035 | 1/1982 | Jordan et al. | 379/61 |
| 4,800,582 | 1/1989 | D'Agosto, III et al. | 379/216 |
| 4,817,127 | 3/1989 | Chamberlin et al. | 379/70 |
| 4,860,336 | 8/1989 | D'Avello et al. | 379/91 |
| 5,197,092 | 3/1993 | Bamburak | 379/201 |
| 5,222,125 | 6/1993 | Creswell et al. | 379/67 |
| 5,243,645 | 9/1993 | Bissell et al. | 379/211 |
| 5,353,331 | 10/1994 | Emery et al. | 379/67 |
| 5,355,404 | 10/1994 | LeDuc et al. | 379/201 |

OTHER PUBLICATIONS

H. W. Kettler, et al. "AT&T's Global Intelligent Network Architecture", AT&T Technical Journal, Sep./Oct. 1992, pp. 30–35.

Q1200 Series of Recommendations, International Telecommunications Union Telecommunications Standards Section (ITU–TSS) formerly CCITT.

Special Report SR–NPL–001623, issued by Bellcore in Jun. 1990, "Advanced Intelligent Network Release 1 Network and Operations Plan".

*Primary Examiner*—Jeffery Hofsass
*Assistant Examiner*—Scott Wolinsky

[57] ABSTRACT

A telephone subscriber who wishes to forward calls placed to that subscriber from a selected set of calling parties identifies the current destination number to a service adjunct. The service adjunct, in turn, transmits the destination number to the intelligent terminals of preselected parties while those intelligent terminals are in an inactive (i.e. on-hook) mode, for storage in a local memory contained in those terminals. Thereafter, when the usual number of the telephone subscriber is "dialed" (e.g., entered on the keypad) at any one of the intelligent terminals, the stored destination number is retrieved and output to the telecommunications network in place of the usual number. The actual destination number is also displayed to the calling party who then has the option to let the call complete or disconnect to stop the call.

17 Claims, 6 Drawing Sheets

FIG. 6

| DIALED NUMBER | CURRENT DESTINATION |
|---|---|
| 908-949-7503 | 212-987-7767 |
| 609-741-2212 | 609-741-5678 |
| 908-949-1234 | 908-949-3333 |
| ⋮ | ⋮ |

FIG. 7

| PERSONAL NUMBER | PIN | CURRENT DESTINATION | X.25 ADDRESS OF TERMINALS THAT RECEIVE CURRENT DESTINATION |
|---|---|---|---|
| 908-949-7503 | 1234 | 212-987-7767 | 3134 1234567890<br>3134 5678912345<br>3134 8901234567<br>⋮ |
| 609-741-2212 | 5678 | 609-741-5678 | 3134 1234567890<br>3134 9876543210<br>⋮ |

INTELLIGENT TERMINAL BASED SELECTIVE CALL FORWARDING

TECHNICAL FILED

This invention relates generally to apparatus and method for completing telephone calls to a called party at a location different from the "normal" location at which calls to that party terminate, and, in particular, to selective call forwarding that is accomplished through the use of intelligent terminals, i.e., terminals that have the capability to store information and to perform logical operations using such information.

BACKGROUND OF THE INVENTION

Intelligent network telephone call processing is now quite common, and telephone network providers, such as LEC's and IXC's, are putting more and more intelligence into their networks. Many details of the intelligent network and the features offered in it are set forth in special Report SR-NPL-001623, issued by Bellcore in June 1990 and entitled "Advanced Intelligent Network Release 1 Network and Operations Plan". Other information relating to the intelligent network may be found in the Q.1200 series of recommendations prepared by the International Telecommunications Union Telecommunications Standards Sector (ITU-TSS, formerly known as CCITT), and in an article entitled "AT&T's Global Intelligent Network Architecture" by Kettler et al. in the AT&T Technical Journal, September/October 1992, at page 30. The development of intelligent networks started before microcomputers became generally available for use in terminals. The current situation is that intelligent networks continue to evolve under the assumption that the terminals connected to those networks are equivalent to ordinary telephones, with, at most, Touch Tone (DTMF) capability.

On the other side of the coin, the intelligent terminal industry is developing rapidly, but independent of the intelligent networks. This is occurring because the terminal industry includes many small, fast moving companies that have not had much success dealing with large network utility companies. The mode of operation for terminal developers is to take the network as they find it, and develop terminal features to make the network more user friendly, or implement end to end services that only use the network as a simple communications channel or pipe.

SUMMARY OF THE INVENTION

We have found that an intelligent terminal can work in concert with a services adjunct in the intelligent network to provide enhanced capabilities to callers, particularly in the context of selective call forwarding. Today, call forwarding is largely provided in the network, usually at a processor associated with the terminating switch serving a subscriber. The subscriber desiring to have calls to a particular number forwarded to another location establishes contact with the network based processor, and enters the forwarding number for calls placed to the subscriber. The subscriber makes the forwarding process selective by also providing information identifying a list of calling parties whose calls should be forwarded. (Calls from other persons, not on the list, may be routed to an answering machine or not answered at all.) When calls to the subscriber reach the processor, they are identified as being calls TO the subscriber in question. Then, the originators are identified to determine that the calls are FROM persons identified by that subscriber as authorized for forwarding. The calls that are thus selected are then refuted to the specified new destination. Often, this leads to "trombone routing", meaning that a call originated from location A must travel to destination C via an intermediate point B which is distant from the straight-line path between A and C. This leads to unnecessary use of network resources and a higher cost of telephone calls, when the same functions can be performed more efficiently with a terminal based solution.

In accordance with our invention, a telephone subscriber who wishes to forward is calls placed to that subscriber from a selected set of calling parties identifies (a) the forwarding number, and b) the selected parties, to a central processor, called a "services adjunct". The services adjunct, in turn, transmits the forwarding number to the intelligent terminals of the selected parties while those intelligent terminals are in an inactive (i.e. on-hook) mode, for storage in a local memory contained in those terminals. Thereafter, when the usual number of the telephone subscriber is "dialed" (e.g., entered on the keypad) at any one of the intelligent terminals, the stored destination number is retrieved and output to the telecommunications network in place of the dialed number. In accordance with one embodiment of the invention, the intelligent terminals are equipped with ISDN connections that enable the transmission of information to the terminals and storage therein while the ISDN terminals are on-hook (not being used). Illustratively, a standard X.25 network can be used to transport the data between the services adjunct and the intelligent terminal. This is consistent with the use of ISDN, because the "D" channel of a Basic Rate Interface (BRI) connection supports the use of the X.25 protocol. In another embodiment of this invention, information is transported from the services adjunct to the intelligent terminal over the network SS7 facilities, and converted into Q.931 type signaling messages by the local switch. In yet another embodiment, information is sent to the local switch by either X.25 or SS7 and downloaded using analog signaling similar to that used today to send the calling party identification to the called party while the phone is in an inactive (e.g., on-hook) mode. In the latter two embodiments, changes are required in the local central office.

BRIEF DESCRIPTION OF THE DRAWING

The present invention will be more fully appreciated by consideration of the following Detailed Description, which should be read in light of the accompanying drawing in which:

FIG. 6 illustrates the format of a record in number translation memory 208 of intelligent terminal 101; and FIG. 7 illustrates the format of a record in the database 123 in services adjunct 111.

DETAILED DESCRIPTION

Figure 1:
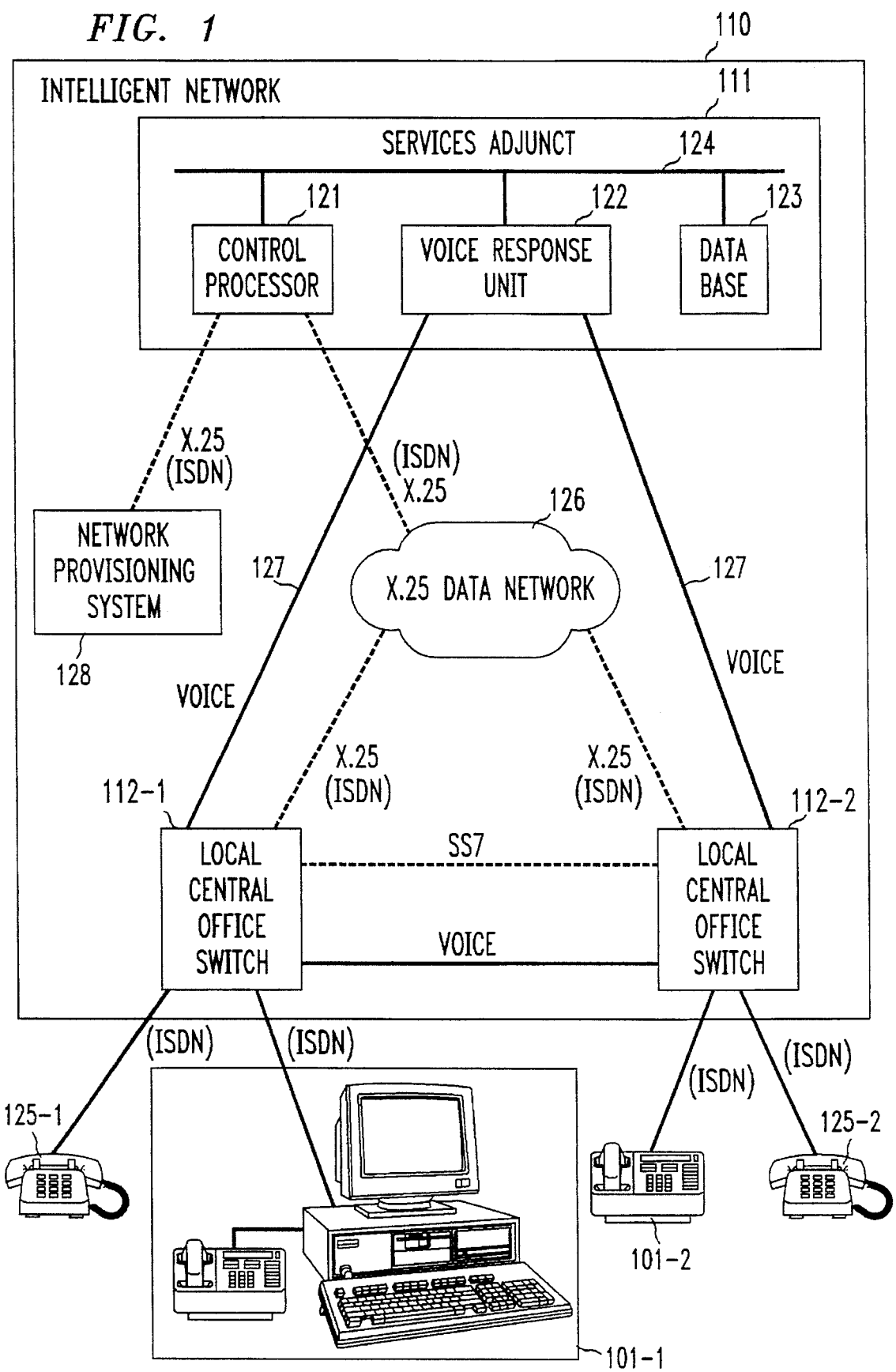
FIG. 1 is a block diagram illustrating the overall arrangement of a system by which one or more intelligent terminals can cooperate with a services adjunct in an intelligent telecommunications network in order to enable the selective forwarding of telephone calls.

Referring first to FIG. 1, there is shown a block diagram illustrating the overall arrangement of one embodiment of our invention in which intelligent terminals 101 cooperate with a services adjunct 111 in an intelligent telecommunications network designated generally as network 110, in order to selectively forward telephone calls. Network 110 includes several interconnected switches 112 which are each connected, directly or indirectly, via an X.25 data network 126, and via voice channels 127, to services adjunct 111. Intelligent terminal 101-1 is connected to switch 112-1 while intelligent terminal 101-2 is connected to switch 112-2. In FIG. 1, "dumb phones" 125-1, which have the capabilities of conventional touch tone telephone instruments, are shown as also being connected to switches 112-1 and 112-2, respectively. Note that the elements of FIG. 1 are shown in greatly simplified form, for ease of explanation; accordingly other network elements normally associated with local and interexchange carriers are not separately shown.

Services adjunct 111 includes a Voice Response Unit (VRU) 122 that is connected to an internal control bus 124 as well as to switches 112 via voice channels 127. VRU 122 is programmed to communicate with calling parties, by prompting them, for example with voice prompts, to enter information such as a Personal Identification Number (PIN) that identifies the subscriber, as well as a desired destination number to which calls to that subscriber are to be forwarded. Optionally, the caller can also be prompted to supply information identifying calling parties having intelligent terminals that are likely to place calls to that subscriber and whose calls should be forwarded, and specifying the directory and routing information for those persons. In order to perform the functions just described, VRU 122 is arranged to (a) perform various database lookups, (b) to perform logical operations on information input by a caller and obtained from a database lookup, and (c) to perform various telephone call management functions, such as reception of telephone calls, call progress monitoring and call disconnection.

Services adjunct 111 also includes a database 123 connected to bus 124, for storing information entered by subscribers and used in the selective call forwarding process of the present invention, and a control processor 121, also connected to bus 124, for managing the various processes described in more detail below. When all required information has been entered by a subscriber in response to voice prompts, VRU 122 confirms this with the calling party, disconnects the calling party, and then updates database 123, via internal bus 124, with new destination information for this subscriber. Database 123, after being updated, informs control processor 121 that an update has been made. Control processor 121 then requests database 123 to download the new destination information and the addresses of the selected intelligent terminals that need the new destination number. This downloading may be accomplished via an X.25 packet data message, sent from control processor 121 via data network 126 and one of the switches 112, to one or more intelligent terminals 101 whose addresses had been provided by the subscriber or entered via network provisioning system 128.

In one specific arrangement of the present invention, switches 112 are #5ESS stored program controlled electronic switching systems available from AT&T. Services adjunct 111 is comprised of a CONVERSANT® Voice Response Unit and a general purpose AINet ™ Service Circuit Node, both of which are available from AT&T. Note that switches 112, which are equipped to provide ISDN services, are connected to services adjunct 111 by both voice channels as well as X.25 packet data connections. The voice channels are used when the subscriber calls the services adjunct 111 to interact with it for the purpose of updating the destination number at which calls are to be received. The X.25 packet data connections are used thereafter by services adjunct 111 to send messages to selected intelligent terminals 101 that need updated destination numbers with respect to calls placed to a particular subscriber. The X.25 data connection is extended to terminals 101 via standard ISDN data communications service.

Figure 2:
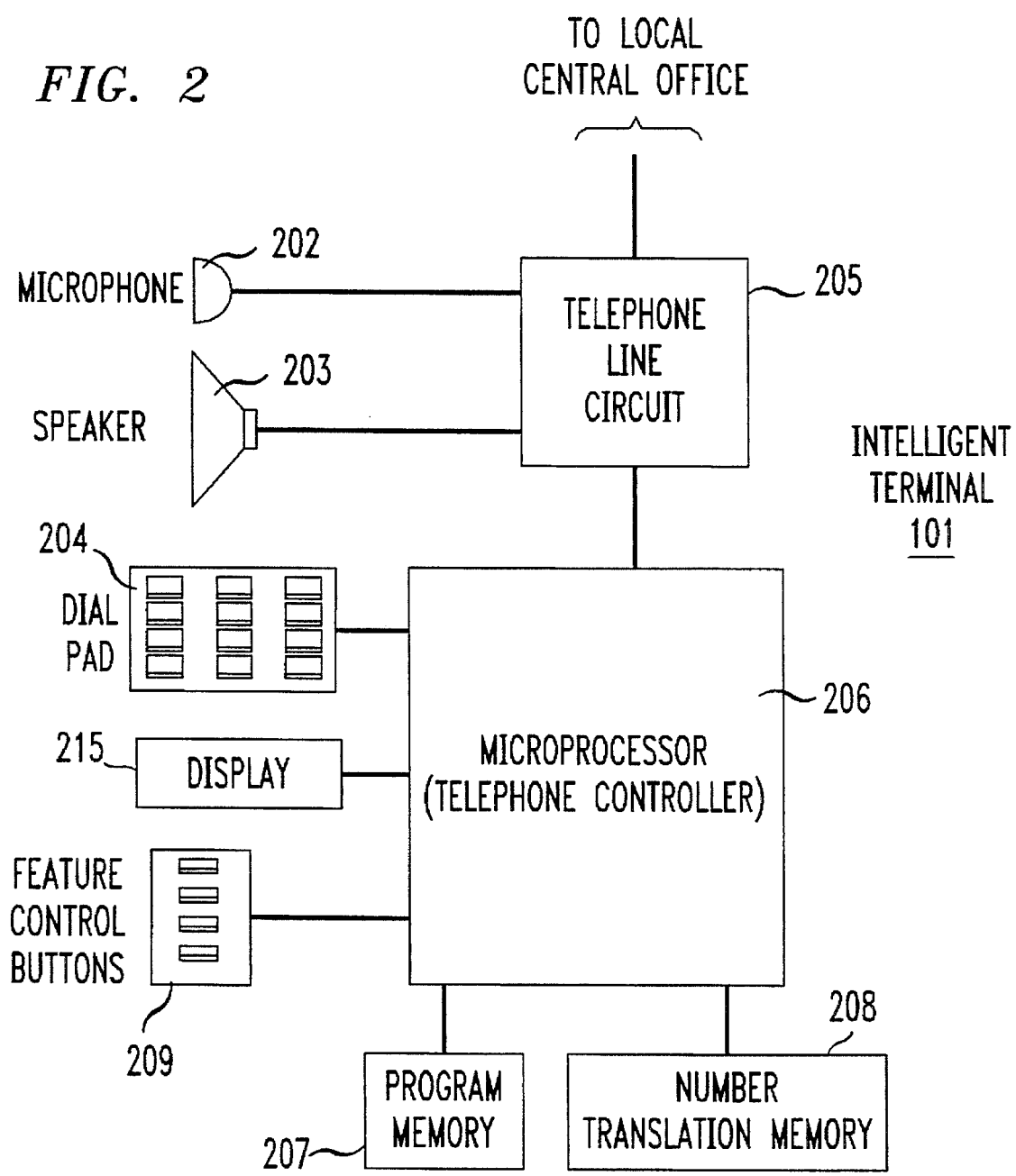
FIG. 2 is a block diagram illustrating the arrangement of an intelligent terminal which can work cooperatively with a services adjunct to selectively forward telephone calls.

FIG. 2 is a block diagram illustrating the arrangement of a typical intelligent terminal 101. As shown in FIG. 2 intelligent terminal 101 includes the normal components of a telephone station, such as a telephone line circuit 205, a microphone 202, a speaker 203, a dial pad and associated touch tone generator 204, and feature control buttons 209. Terminal 101 also includes a memory device 208 that can store records of the type shown in FIG. 8 on a long term basis, and a microprocessor 206 arranged to operate under the control of program instructions stored in a program memory 207, which thereby controls the operation of those various components and performs the processes described below in connection with FIGS. 5 and 6. Note here that, as discussed further below, terminal 101 can also be a wireless telephone.

Figure 3:
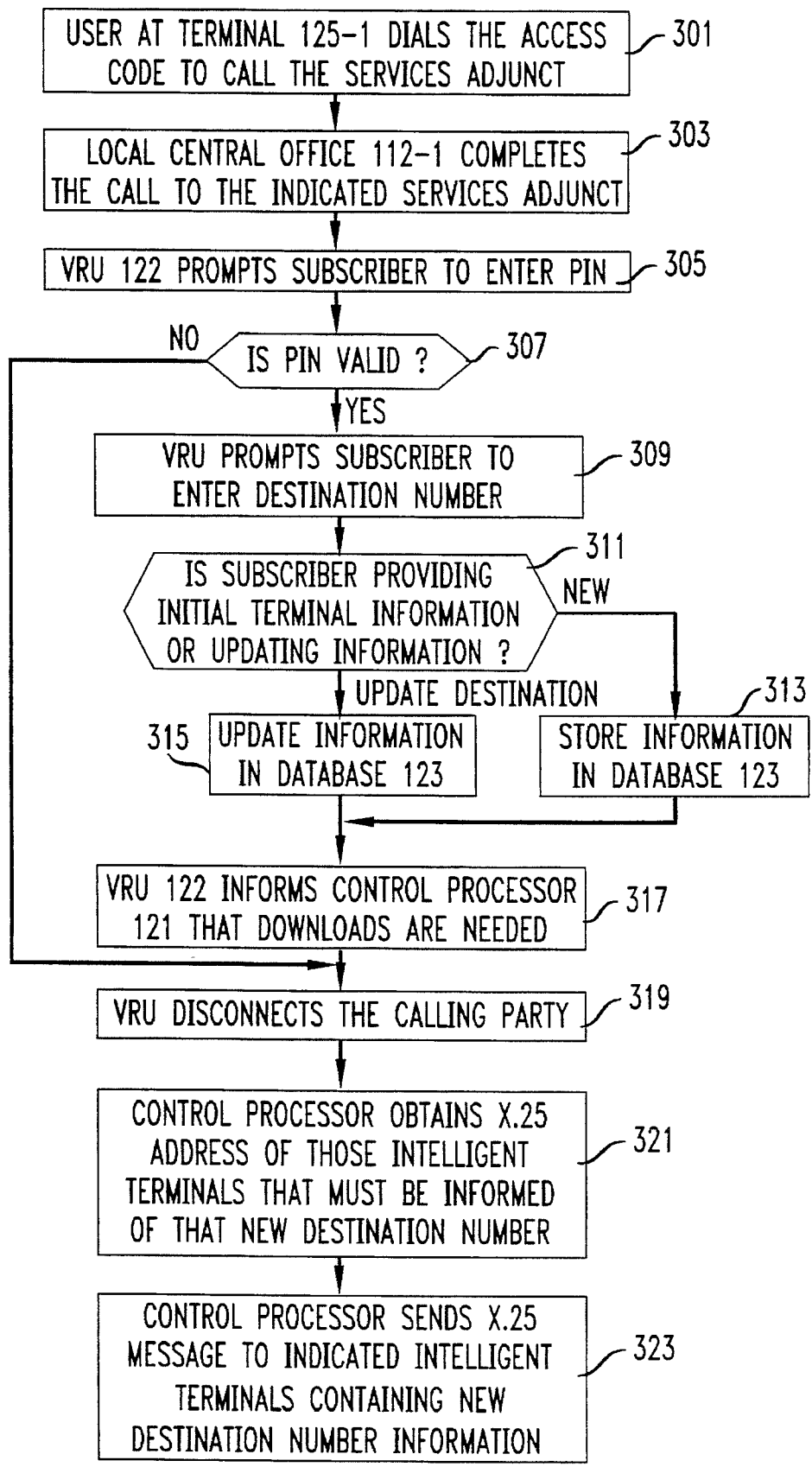
FIG. 3 illustrates the process performed when a subscriber instructs services adjunct 111 of FIG. 1 to forward selected calls placed to that subscriber's usual number to a new destination number and when adjunct 111 subsequently stores or updates is information in the memory in the intelligent terminals.

FIG. 3 illustrates the process performed when a subscriber wishes to instruct services adjunct 111 in intelligent network 110 to selectively forward calls placed to that subscriber's usual number, to a different location. The process may be initiated from any location, illustratively from an ordinary touch tone telephone station 125, and begins in step 301, when a subscriber places a call to services adjunct 111, illustratively by dialing an 800 toll free or other number associated generally with that adjunct and specifically with the forwarding service contemplated by the present invention. The call is routed by the switch in the local central office that is associated with telephone station 125, in this case, switch 112-1, via a voice path, to VRU 122 in services adjunct 111, in step 303, and the VRU, in step 305 prompts the calling party to enter a PIN identifying him or her as a particular subscriber entitled to use service and obtain the advantages of the present invention. If the PIN is validated in step 307, VRU 122 prompts the subscriber, in step 309, to enter the telephone number of the destination to which the subscriber desires that his or her calls be forwarded. This number can be entered using a DTMF dial pad, or alternatively spoken, if VRU 122 is equipped with speech recognition apparatus.

Next, in step 311, a determination is made as to whether or not the subscriber is (a) providing new information adding or deleting intelligent terminals that are to receive the telephone number of the destination to which the subscriber desires that his or her calls be forwarded, or (b) is updating destination information that was previously provided. If the response indicates situation (a), the subscriber is prompted, in step 313, to provide the identifying information, which may be the X.25 address of selected intelligent terminals, the telephone number of selected terminals, or other identifying information, all of which is stored in database 123. If the response indicates situation (b), then information stored in database 123 is updated in step 315.

Figure 4:
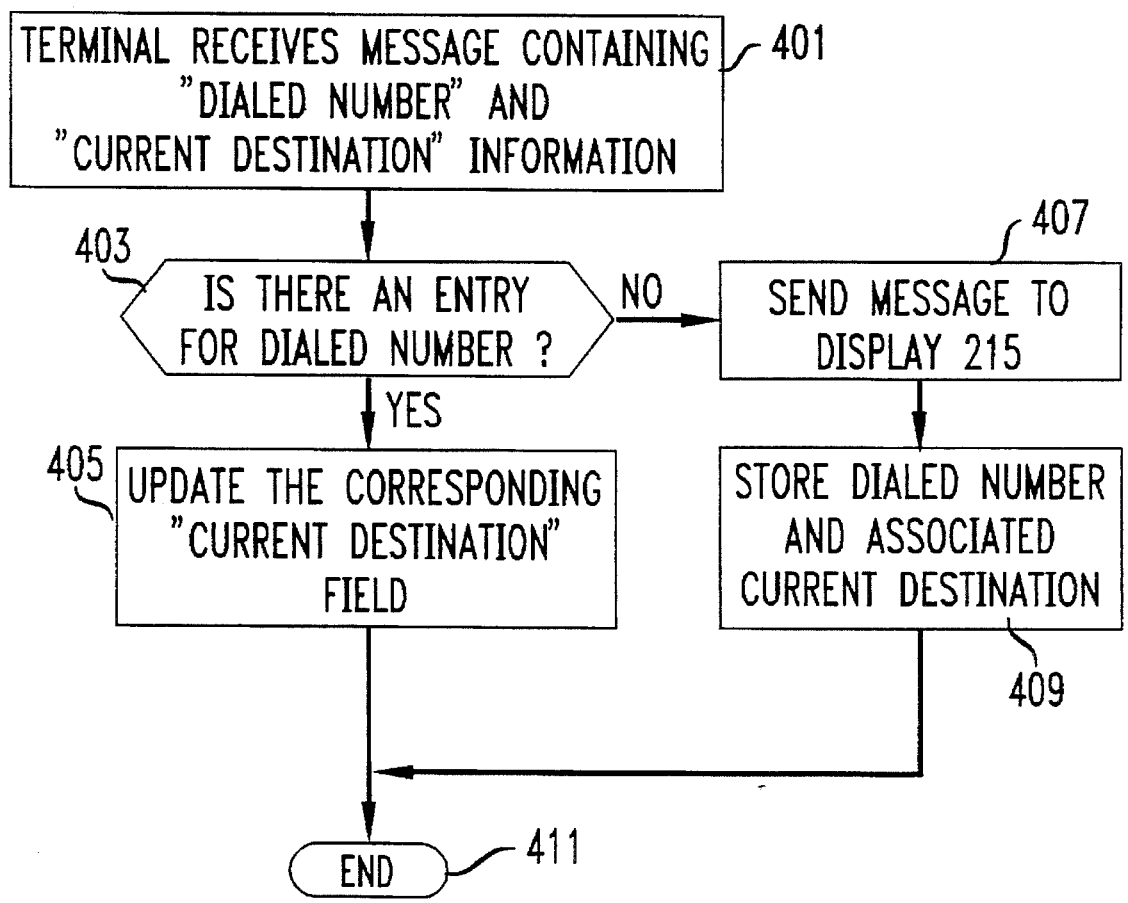
FIG. 4 illustrates the process performed by an intelligent terminal when the services adjunct instructs it to update the destination number for a particular usually dialed number.

After steps 313 or 315 are completed, the process of FIG. 3 proceeds to step 317, in which VRU 122 signals control processor 121 that downloads of destination number information to the selected intelligent terminals, as described in connection with FIG. 4 are required. The process then proceeds to step 319, in which VRU 122 disconnects the subscriber. Note here that if the PIN entered by the caller was not determined to be valid in step 307, the subscriber is then also disconnected by proceeding directly to step 319.

Next, in step 321, control processor 121 obtains from database 123 information identifying the selected intelligent terminals 101 that must be updated, and sends to those terminals, in step 323, information identifying (a) the dialed number associated with a subscriber, and (b) a new destination number for that subscriber, illustratively sent in the form of X.25 packet data messages. Thus, as an example, intelligent terminals 101-1 and 101-2 may receive and store (as explained in connection with FIG. 4 below), information indicating that calls to (908) 949-7503 should be placed instead to (212) 987-7767. See the first entry in the table illustrated in FIG. 6, discussed in more detail below.

The manner in which information is transmitted from services adjunct 111 to intelligent terminals 101 can involve several approaches. First, as indicated above, the "D" channel of a Basic Rate Interface (BRI) connection supports the use of the X.25 protocol. Any of three X.25 data communications techniques can be used to link the control processor 121 in the services adjunct 111 to each of the intelligent terminals 101-x. One technique is the switched virtual circuit, in which the control processor sends a call set up message to data network 126, and after that call request is accepted by terminal 101, data is sent in a subsequent packet labeled with the appropriate virtual circuit number after which the virtual circuit is disconnected by both ends. A permanent virtual circuit is similar, with the exception that the virtual circuit is not disconnected after data is sent. The same virtual circuit number is used each time the control processor updates a particular intelligent terminal 101. The third technique, known as "Fast Select Service", provides for the transmission of up to 128 octets of data in the same packet that is used to establish the virtual circuit. With this technique, terminal 101 receives the call set up packet with the data and immediately disconnects from the call. All three techniques are well known to those skilled in the X.25 art. In another arrangement, information is transported from services adjunct 111 to intelligent terminals 101 over the network SS7 facilities, as part of the Q.931 signaling messages. In this type of embodiment, the present invention would be implemented using the Signaling System 7 (SS7) network as a replacement for the X.25 network 126. To use SS7, control processor 121 would connect to each of the local switches 112 via standard SS7 links. Messages to intelligent terminals 112 would be transmitted in the Transaction Capabilities Application Part (TCAP) protocol, which is currently used in SS7 networks for other non circuit related messages, such as an 800 number transaction with a Service Control Point. Within the local central office 112, such TCAP messages would be translated into Q.931 ISDN signaling messages. Such interworking is currently supported in local central offices to pass ISDN signaling messages over the SS7 network. See ITU Recommendation Q.699 entitled "Interworking Between Digital Subscriber Signaling System No. 1 and Signaling System No. 7". For example, an ISDN Q.931 "Setup" message is mapped into an SS7 ISDN User Part (ISUP) "Initial Address Message", and an ISDN "Connect" message is mapped into an SS7 "Answer Message". Extension of these techniques to the current invention is straightforward, but requires modification of the local central office.

In yet another arrangement, information is downloaded from local central offices 112 to intelligent terminals 101 using analog signaling similar to that used today to send the calling party identification to the called party before the call is answered. In this arrangement, changes are required in the local central office. Specifications related to the transmission of analog data to a properly equipped on-hook telephone not associated with ringing are contained in Bellcore Technical Reference TR-NWT-000030 Issue 2 dated October 1992"Voiceband Data Transmission Interface Generic Requirements" beginning at page 4, paragraph 2.3.2. The recommended technique is to use a 150 to 350 millisecond Open Switching interval (OSI) to signal loop transmission equipment (if it exists) that an on-hook transmission path is required. This is then followed after 300 milliseconds with the data to be sent in Binary Frequency Shift Keying (BFSK) modulation at 1200/2200 Hz. With the current invention, the central office would received the data over either the X.25 or SS7 data networks and then convert it into the analog format and sent it to the on-hook analog terminal without ringing.

If intelligent terminal 101 is a wireless terminal, updates from database 123 may be received over the signaling channel while the wireless terminal is active but on-hook.

It is to be noted here that the process illustrated in FIG. 3 can be quite similar to the a portion of the process performed in basic service adjunct 150 shown in FIG. 1 of U.S. Pat. No. 5,222,125 issued to Creswell et al. on Jun. 22, 1993 and assigned to the same assignee as the present invention, which patent is hereby incorporated by reference herein.

FIG. 4 illustrates the process used by an intelligent terminal 101 to update information in its number translation memory 208 in response to receiving information, such as in an X.25 data message, from services adjunct 111. The process begins in step 401, when a terminal, in an on-hook or idle state, receives an X.25 message containing a dialed number and an associated destination number. In response to receipt of the message, terminal 101, under the control of a program stored in program memory 207, checks number translation memory 208 in step 403 to determine if there is an entry for the dialed number indicated in the message. If so, then in step 405, the destination number in the message is stored in memory 208 in association with the dialed number, replacing the destination number that had been previously stored. On the other hand, if the called number is not in number translation memory 208, then in step 407, an indication is given, such as by a message on display 215, indicating that the destination number for a new dialed number has been received. Thereafter, in step 409, the destination number is stored in number translation memory 208, provided that an indication is not received via dial pad 204 that the person using the intelligent terminal does not wish the information to be stored. In either event, the process is terminated in step 411, and thereafter repeated when a new message is received from services adjunct 111.

Figure 5:
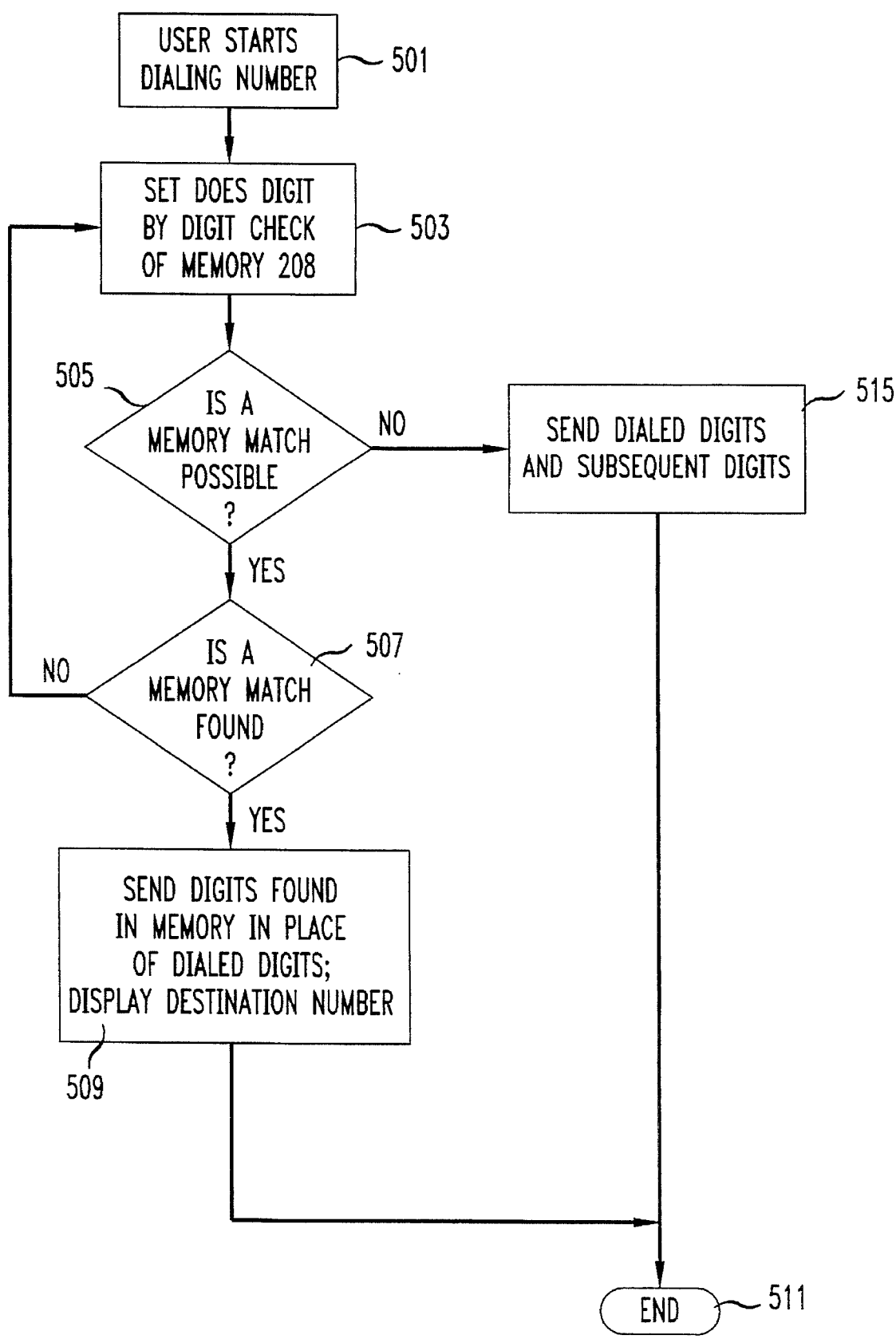
FIG. 5 illustrates the process performed by an intelligent terminal 101 when the user dials a number to place a call.

FIG. 5 illustrates that process performed in the intelligent terminal 101 of FIG. 1 when a call is placed to the usual number of a subscriber who has previously requested call forwarding using the process of FIG. 2. The process begins in step 501 when the person using the intelligent terminal starts dialing a number, using dial pad 204. As each digit is dialed, a digit by digit check is performed in step 503, to determine if there could be an entry in number translation memory 208 that matches the dialed number. If it is determined in step 505, at any point in the dialing process, that a memory match is no longer possible, since the digits already dialed do not match any of the numbers stored in number translation memory 208, the process proceeds to step 515 in which all of the dialed digits, plus any subsequently dialed digits, are sent from the intelligent terminal to the switch 112 to which it is connected. This, in effect, yields ordinary, non-forwarded calling. On the other hand, if a positive result is obtained in step 505, a determination is made in step 507 as to whether it can be determined if there has been a match between the dialed digits and a stored number. If not, the process returns to step 503 and repeats the process described above.

If and when a positive result is obtained in step 507, the process of FIG. 5 proceeds to step 509, in which the previously stored destination number associated with the dialed number is sent from the intelligent terminal to the switch 112 to which it is connected. This, in effect, produces call forwarding to the destination number specified by the subscriber. Note that interaction between the intelligent terminal and elements within the telecommunications network is not required at the time that a call is originated, and, accordingly, call set-up time can be significantly reduced. The stored destination number can also be displayed on display 215 in step 509, so that the call can be terminated (as by disconnecting or hanging up) if the person making the call does not wish to complete the call to the destination number displayed. After completion of steps 509 or 515, the process of FIG. 5 is terminated in step 511.

FIG. 6 illustrates the format of typical information stored in number translation memory 108 within intelligent terminal 101 of FIG. 1. In this FIGURE, each line can be considered as a separate record. Each record represents information obtained through a download initiated by a particular subscriber, and includes a dialed number, in field 601, and an associated current destination number for that dialed number, in field 602. If desired, an additional field 603 can be included in each record for a flag bit, which indicates that dialed number and its associated destination number are newly stored, and should be displayed on the terminal display, so that a user can determine if the information should continue to be stored, or be deleted.

FIG. 7 illustrates the format of a record contained in database 123 within the services adjunct 111 of FIG. 1. In this figure, the information shown represents the records for two subscribers, and different subscribers would have records containing different information. Each record of the type shown in FIG. 7 includes a personal number, in field 701, and an associated current destination number for that dialed number, in field 702. Also included, for each subscriber, is a PIN in field 703, that is used for validation purposes as explained above. Information identifying one or more intelligent terminals that are designated to receive forwarding information for this subscriber is contained in field 704, and can illustratively include routing information needed to send a X.25 packet data message to the appropriate intelligent terminals.

The format for X.25 addresses are specified in ITU-TS (formerly CCITT) document X.121. Such addresses are comprised of a 3-digit country code (may be more than one per country), a 1-digit network identifier, and a terminal address of up to 10 digits. Alternatively, information contained in field 704 can be telephone numbers of selected intelligent terminals in embodiments of the invention in which information is sent to the terminal via a voice channel while the station is on-hook.

Persons skilled in the art will appreciate that various modification and adaptations may be made of the present invention. For example, although services adjunct 111 is shown as included within intelligent network 110, it will be appreciated that the functions performed thereby can be performed by an appropriately configured personal computer based processor that is connected to the telecommunications network via a Basic Rate Interface (BRI) connection. Accordingly, the invention should be limited only by the appended claims.

What is claimed is:

1. A method for transferring information to intelligent terminals, for use in forwarding calls, comprising the steps of:

storing information identifying (a) a personal number of a subscriber, (b) a forwarding number associated with said personal number, and (c) said intelligent terminals of selected calling parties, in a central processor, transmitting said personal number and said forwarding number to said intelligent terminals of said selected calling parties while said intelligent terminals of said selected calling parties are in an on-hook mode, and recording said personal number and said forwarding number in said intelligent terminals of said selected calling parties.

2. The method of claim 1, further comprising the step of:

when said personal number of said subscriber is dialed at a given one of said intelligent terminals, retrieving said forwarding number recorded thereat, and outputting said forwarding number to a telecommunications network in place of said personal number.

3. The method of claim 1 wherein said transmitting step includes transmitting said personal number and said forwarding number to said intelligent terminals via ISDN connections using X.25 packet data communications.

4. The method of claim 1 wherein said transmitting step includes transmitting said personal number and said forwarding number to said intelligent terminals via network SS7 facilities, which are mapped into Q.931 signaling messages.

5. The method of claim 1 wherein said transmitting step includes transmitting said personal number and said forwarding number to said intelligent terminals using analog signaling.

6. The method of claim 1 wherein said central processor is located in a telecommunications network.

7. The method of claim 1 wherein said central processor is connected to a telecommunications network via an ISDN BRI connection.

8. The method in claim 1 wherein said intelligent terminals are wireless terminals and wherein said personal number and said forwarding number are transmitted to said wireless terminals of said selected calling parties via a control channel while said wireless terminals of said selected calling parties are in an on-hook mode.

9. A method for processing calls in an intelligent station so that calls to preselected personal numbers are forwarded to associated forwarding numbers, said method comprising the steps of:

receiving, while said intelligent station is in an on-hook condition, information from a services adjunct identifying (a) a dialed personal number, and (b) an associated forwarding number to be used in place of the dialed personal number;

storing said information in a memory in said intelligent station;

determining if the dialed personal number has a stored associated forwarding number;

if a stored associated forwarding number exists, completing a call using said associated forwarding number in place of said dialed personal number.

10. The method defined in claim 9 further including the step of displaying said forwarding number prior to completing said call.

11. Apparatus for transferring information to intelligent terminals, comprising:

a database for storing information identifying (a) a personal number of a subscriber, (b) a forwarding number associated with said personal number, and (c) said intelligent terminals of selected calling parties, and means for transmitting said personal number and said associated forwarding number to said intelligent terminals of said selected calling parties while said intelligent terminals are in an on-hook mode; and means for recording said personal number and said forwarding number at said intelligent terminals of said selected calling parties.

12. The apparatus of claim 11 wherein said intelligent terminals include means arranged so that, when said personal number of said telephone subscriber is dialed, said associated forwarding number is retrieved and output to the telecommunications network in place of said personal number.

13. The apparatus of claim 11 wherein said transmitting means includes means for transmitting said personal number and said associated forwarding number to said intelligent terminals via ISDN connections using X.25 packet data communications.

14. The apparatus of claim 11 wherein said transmitting means includes means for transmitting said personal number and said associated forwarding number to said intelligent terminals via network SS7 facilities, as part of the Q.931 signaling messages.

15. The apparatus of claim 11 wherein said transmitting means includes means for transmitting said personal number and said associated forwarding number to said intelligent terminals using analog signaling.

16. An intelligent terminal for processing calls so that calls to preselected personal numbers are forward to associated forwarding numbers, said intelligent terminal comprising:

means for receiving, while said intelligent terminal is in an on-hook condition, information from a services adjunct identifying (a) a dialed personal number, and (b) an associated forwarding number to be used in place of the dialed number;

a memory for storing said information in said intelligent terminal;

means for determining, when a number is dialed from said intelligent terminal, if the number matches a stored dialed personal number; and means for completing a call using said associated forwarding number in place of the dialed personal number, if a match is determined by said means for determining.

17. The intelligent terminal defined in claim 16 further including means for displaying said associated forwarding number prior to completing said call.

* * * * *